US011111373B2

(12) United States Patent
Hsieh

(10) Patent No.: US 11,111,373 B2
(45) Date of Patent: Sep. 7, 2021

(54) POLYMETHACRYLATE COMPOSITION AND OPTICAL DEVICE MADE THEREFROM, AND DISPLAY APPARATUS

(71) Applicant: Chi Mei Corporation, Tainan (TW)

(72) Inventor: Shang-Ju Hsieh, Tainan (TW)

(73) Assignee: Chi Mei Corporation, Tainan (TW)

( * ) Notice: Subject to any disclaimer, the term of this patent is extended or adjusted under 35 U.S.C. 154(b) by 0 days.

(21) Appl. No.: 16/699,094

(22) Filed: Nov. 28, 2019

(65) Prior Publication Data

US 2020/0181388 A1 Jun. 11, 2020

(30) Foreign Application Priority Data

Dec. 5, 2018 (TW) ................................ 107143616
Nov. 7, 2019 (TW) ................................ 108140427

(51) Int. Cl.
*C08L 33/12* (2006.01)
*G02B 1/04* (2006.01)
*G02B 5/02* (2006.01)

(52) U.S. Cl.
CPC ................ *C08L 33/12* (2013.01); *G02B 1/04* (2013.01); *C08L 2201/08* (2013.01); *C08L 2201/10* (2013.01); *C08L 2203/16* (2013.01); *G02B 5/0215* (2013.01); *G02B 5/0278* (2013.01)

(58) Field of Classification Search
CPC .. C08L 33/12; C08L 2201/10; C08L 2203/16; C08L 2201/08; G02B 1/04; G02B 5/0215
See application file for complete search history.

(56) References Cited

U.S. PATENT DOCUMENTS 8,815,990 B2 8/2014 Kimura et al.
2016/0017106 A1 1/2016 Gerard

FOREIGN PATENT DOCUMENTS

CN 1315949 5/2007
CN 202151423 2/2012
CN 103910961 7/2014
CN 105246691 1/2016
CN 110016195 7/2019
FR 2091500 1/1972
JP 2005047969 2/2005
JP 2009282146 12/2009
JP 2010217357 9/2010
JP 2012107092 6/2012
TW 201504337 2/2015
TW 201700588 1/2017
WO 2014187500 11/2014
WO 2017162393 9/2017
WO WO 2017/162393 A1 * 9/2017
WO 2017191826 11/2017

OTHER PUBLICATIONS

Arai Y et al., "Resin composition for molded product such as polarizing plate protective film and phase difference film, contains thermoplastic resin composition and antioxidant consisting of phenolic antioxidant and/or phosphorus type antioxidant", Clarivate Analytics, Aug. 21, 2008, pp. 1-2
"Office Action of Taiwan Counterpart Application", dated Jul. 31, 2020, p. 1-p. 9.
"Office Action of China Counterpart Application", dated Oct. 9, 2020, pp. 1-8.
"Office Action of China Counterpart Application", dated May 27, 2021, pp. 1-10.
Cui Keqing, "Dictionary of Safety Engineering" Beijing: Chemical Industry Press, Nov. 1995, pp. 1-6.
"Office Action of China Related Application No. 201911229583.4", dated Jun. 30, 2021, pp. 1-11.

* cited by examiner

*Primary Examiner* — Robert D Harlan
(74) *Attorney, Agent, or Firm* — JCIPRNET

(57) ABSTRACT

A polymethacrylate composition, an optical device made therefrom, and a display apparatus are provided. The polymethacrylate composition includes 50 to 85 parts by weight of methacrylate series polymer, 15 to 50 parts by weight of styrene series-maleic anhydride series copolymer, and an aromatic compound having a phosphite group. The methacrylate series polymer includes methacrylate series monomer unit and acrylate series monomer unit and has a weight average molecular weight (Mw) in a range between 20,000 and 200,000. The styrene series-maleic anhydride series copolymer includes 65 wt %-85 wt % of styrene series monomer unit, 15 wt %-35 wt % of maleic anhydride series monomer unit, and 0-20 wt % of second copolymerizable monomer unit. The content of the aromatic compound having a phosphite group in the polymethacrylate composition is 200 ppm-900 ppm.

16 Claims, 4 Drawing Sheets

POLYMETHACRYLATE COMPOSITION AND OPTICAL DEVICE MADE THEREFROM, AND DISPLAY APPARATUS

CROSS-REFERENCE TO RELATED APPLICATION

This application claims the priority benefits of Taiwan application serial no. 107143616, filed on Dec. 5, 2018, and Taiwan application serial no. 108140427, filed on Nov. 7, 2019. The entirety of each of the above-mentioned patent applications is hereby incorporated by reference herein and made a part of this specification.

BACKGROUND OF THE INVENTION

1. Field of the Invention

The present disclosure relates to a polymer composition, particularly to a polymethacrylate composition and an optical device made therefrom, and a display apparatus.

2. Description of Related Art

Polymethacrylate is a widely used polymer that has been well evaluated in terms of processability, physical properties and mechanical properties, has equivalent transmittance to glass and favorable appearance of the molded article, thus, has become one of the most excellent polymer transparent materials at present, and is often applied to various optical devices or consumer products such as camera lenses, lenses, optical films, car taillights, billboards, etc.

In recent years, with the development of thin lightweight notebook computers, the requirements for thinning and high performance of optical devices in display devices such as liquid crystal display devices have also increased. In addition, with the wider application environment of the liquid crystal display devices, optical devices are also required to have durability properties such as heat resistance in a high-temperature environment and moisture resistance in a high-humidity environment.

Therefore, additives, which can improve the heat resistance, are currently added to polymethacrylate, but it has been found that such changes affect the optical properties of polymethacrylate.

SUMMARY

The present disclosure provides a polymethacrylate composition, an optical device made from the composition, which can both have heat resistance and optical properties of the polymethacrylate composition, and a display apparatus comprising the optical device.

The polymethacrylate composition of the present disclosure includes 50 to 85 parts by weight of methacrylate polymer, 15 to 50 parts by weight of styrene-maleic anhydride copolymer, and an aromatic compound having a phosphite group. The methacrylate polymer includes methacrylate monomer unit and acrylate monomer unit and has a weight average molecular weight (Mw) in a range between 20,000 and 200,000. The styrene-maleic anhydride copolymer includes 65 wt %-85 wt % of styrene monomer unit, 15 wt %-35 wt % of maleic anhydride monomer unit, and 0-20 wt % of second copolymerizable monomer unit. The content of the aromatic compound having a phosphite group in the polymethacrylate composition is 200 ppm-900 ppm.

The optical device of the present disclosure is made from the above-mentioned polymethacrylate composition.

In an embodiment of the present disclosure, the optical device is at least one selected from the group consisting of an optical plate, an optical sheet, and an optical film.

The display apparatus of the present disclosure comprises the optical device. The display apparatus is at least one selected from the group consisting of a television, a digital camera, a digital photo frame, a mobile phone, a notebook personal computer, a mobile computer, a monitor used in a computer, a portable game console, a portable information terminal, an audio reproduction apparatus, a game console, and a car display.

Based on the above, the polymethacrylate composition of the present disclosure has a specific composition and ratio, thus it can have heat resistance, thermal stability, and optical properties. Therefore, it can be applied to optical devices and has excellent optical properties of low haze and low yellow index. The display apparatus having above optical device is also excellent in display effect.

In order to make the aforementioned and other objectives and advantages of the present disclosure comprehensible, embodiments are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
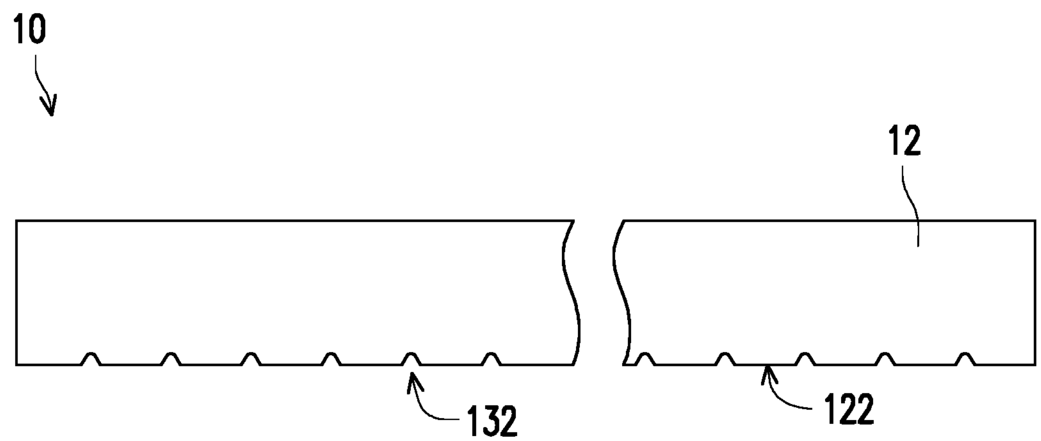
FIG. 1A is a cross-sectional schematic of an optical device according to one embodiment of the disclosure.

Hereinafter, embodiments of the present disclosure will be described in detail. However, these embodiments are exemplary, and the disclosure of the present disclosure is not limited thereto.

In an embodiment of the present disclosure, the polymethacrylate composition includes 50 to 85 parts by weight of methacrylate polymer, 15 to 50 parts by weight of styrene-maleic anhydride copolymer, and an aromatic compound having a phosphite group. The methacrylate polymer includes methacrylate monomer unit and acrylate monomer unit. A weight average molecular weight (Mw) of the methacrylate polymer is in a range between 20,000 and 200,000. The styrene-maleic anhydride copolymer includes 65 wt %-85 wt % of styrene monomer unit, 15 wt %-35 wt % of maleic anhydride monomer unit, and 0-20 wt % of second copolymerizable monomer unit. The content of the aromatic compound having a phosphite group in the polymethacrylate composition is 200 ppm-900 ppm.

Methacrylate Polymer

The methacrylate polymer is mainly polymerized from a monomer mixture mainly composed of methacrylate monomers. In an embodiment, the methacrylate polymer is polymerized from a mixture containing methacrylate monomer and acrylate monomer, and has a weight average molecular weight (Mw) in a range between 20,000 and 200,000, such as in a range between 50,000 and 150,000 or in a range between 70,000 and 110,000; and preferably, the methacrylate polymer is polymerized from a mixture containing methacrylate monomer, acrylate monomer and first copolymerizable monomer.

The methacrylate monomer include, but are not limited to: methyl methacrylate, ethyl methacrylate, propyl methacrylate, n-butyl methacrylate, amyl methacrylate, cyclohexyl methacrylate, heptyl methacrylate, n-octyl methacrylate, octadecyl methacrylate, phenyl methacrylate, benzyl methacrylate, 2-ethylhexyl methacrylate, etc., and the above-mentioned monomers can be used alone or in combination.

The acrylate monomer include, but are not limited to: methyl acrylate, ethyl acrylate, propyl acrylate, butyl acrylate, amyl acrylate, n-hexyl acrylate, cyclohexyl acrylate, heptyl acrylate, dodecyl acrylate, phenyl acrylate, benzyl acrylate, 2-ethylhexyl acrylate, octadecyl acrylate, etc. The above-mentioned monomers can be used alone or in combination.

The first copolymerizable monomer include, but are not limited to: (1) unsaturated carboxylic acid monomer, for example but not limited to acrylic acid, methacrylic acid, maleic acid, itaconic acid, citraconic acid, aconitic acid, etc.; (2) maleimide monomer, for example but not limited to maleimide, N-methylmaleimide, N-isopropylmaleimide, N-butylmaleimide, N-hexylmaleimide, N-octylmaleimide, N-dodecylmaleimide, N-cyclohexylmaleimide, N-phenylmaleimide, N-2,3-tolylmaleimide, N-2,4-tolylmaleimide, N-2,3-ethylphenylmaleimide, N-2,4-ethylphenylmaleimide, N-2,3-butylphenylmaleimide, N-2,4-butylphenylmaleimide, N-2,6-tolylmaleimide, N-2,3-chlorophenylmaleimide, N-2,4-chlorophenylmaleimide, N-2,3-bromophenylmaleimide, N-2,4-bromophenylmaleimide, etc.; (3) propenyl-containing compound monomer, for example but not limited to acrylamide, acrylonitrile, α-methacrylonitrile, allyl glycidyl ether, or glycidyl (meth)acrylate; (4) vinyl-containing compound monomer, for example but not limited to vinyl acetate or chloroethene; and (5) styrene monomer, for example but not limited to styrene, 2-chlorostyrene, 4-chlorostyrene, bromostyrene, vinyl toluene, α-methylstyrene, p-tert-butylstyrene, p-methylstyrene, o-methylstyrene, m-methylstyrene, 2,4-dimethylstyrene, ethylstyrene, etc. The above-mentioned monomers can be used alone or in combination.

In an embodiment, the methacrylate polymer includes the methacrylate monomer unit, the acrylate monomer unit, and the first copolymerizable monomer unit. The term “monomer unit” as used herein refers to a repetitive structure formed by the polymerization reaction of the aforementioned methacrylate monomer, acrylate monomer, or first copolymerizable monomer.

In an embodiment, the methacrylate polymer includes 92 wt %-99 wt % of the methacrylate monomer unit and 1 wt %-8 wt % of the acrylate monomer unit. Besides, based on the total weight of the methacrylate polymer, the methacrylate polymer may further include 0-7 wt % of the first copolymerizable monomer unit according to needs.

In an embodiment, a weight average molecular weight (Mw) of the methacrylate polymer is in a range between 20,000 and 200,000, such as between 50,000 and 150,000 or 60,000 and 140,000; and preferably, between 70,000 and 130,000.

The methacrylate polymer may be prepared by using a solution or bulk polymerization method, and it is preferable to perform a polymerization reaction in the presence of a solvent in order to prevent the polymerization reaction from being difficult to control due to an increase in the viscosity of the crude polymer. The viscosity of the methacrylate polymer is usually expressed in terms of solid content, and the amount of solvent must be adjusted so that the solid content of the crude polymer is less than 50 wt %, or preferably less than 40 wt %.

If the boiling point of the solvent is similar to the boiling point of the main monomer to be polymerized, the mixture of the solvent and the monomer will have a relatively narrow boiling point range, thereby reducing the chance of mixing contaminants in the recycled mixture, and thus the step of intermediate fractionation on the recycled monomer and solvent mixture can be omitted. For example, a solvent having a boiling point close to that of the methacrylate monomer may be selected; preferably, the solvent has a boiling point of 40° C. to 225° C., and more preferably 60° C. to 150° C. Specific examples of the above-mentioned solvent include, but are not limited to: hexane, heptane, octane, benzene, toluene, p-xylene, o-xylene, m-xylene, ethylbenzene, cyclohexane, cyclodecane, isooctane, or various low-boiling hydrocarbon or aromatic hydrocarbon solvents. The above-mentioned solvents can be used alone or in combination.

The polymerization reaction of the methacrylate polymer is initiated by a radical initiator. The radical initiator is not particularly limited, specific examples include but are not limited to: (1) azo compounds: for example 2,2'-azobis-(isobutyronitrile) (AIBN for short), 2,2'-azobis-(2-methylbutyronitrile) (AMBN for short), 2,2'-azobis-(2,4-dimethylvaleronitrile) (ADVN for short), etc.; (2) diacyl peroxides compounds: for example dilauroyl peroxide, decanoyl peroxide, dibenzoyl peroxide (BPO for short), etc.; (3) dialkyl peroxides compounds: for example 2,5-dimethyl-2,5-di-(t-butylperoxy) hexane, dicumyl peroxide, 1,3-bis-(t-butyl peroxy isopropyl)benzene, etc.; (4) peroxyesters compounds: for example t-butylperoxypivalate, 2,5-dimethyl-2,5-di(2-ethyl hexanoylperoxy) hexane, etc.; (5) peroxycarbonates compounds: for example tert-amylperoxy 2-ethylhexyl carbonate, tert-butylperoxy 2-ethylhexyl carbonate, etc.; (6) peroxydicarbonates compounds: for example dimyristyl peroxydicarbonate, di(4-tert-butylcyclohexyl peroxydicarbonate), etc.; (7) peroxyketal compounds: for example 1,1-di (tert-butylperoxy)-3,3,5-trimethylcyclohexane, 2,2-di(4,4-di (tert-butylperoxy) cyclohexyl)propane, etc.; (8) hydroperoxides compounds: for example t-butyl hydroperoxide, isopropylcumyl hydroperoxide, etc.; and (9) others: 2,3-dimethyl-2,3-diphenyl-butane, potassium persulfate, sodium persulfate, ammonium persulfate, etc. In an embodiment, the radical initiator is 2,2'-azobis-(isobutyronitrile). Based on 100 parts by weight of the total amount of the monomer mixture fed, the amount of the radical initiator may be 0.01 to 1 part by weight, such as 0.03 to 0.5 part by weight or 0.07 to 0.1 part by weight.

The polymerization reaction for preparing the methacrylate polymer can be performed at normal temperature, but the reaction system can be heated to increase the polymerization speed. The reaction temperature is generally about 5° C. to 200° C., such as 20° C. to 130° C. or 30° C. to 100° C. During the polymerization process, a chain transfer agent can be added according to needs to facilitate the control of molecular weight; the chain transfer agent is, for example but not limited to: n-dodecyl mercaptan (NDM for short), stearyl mercaptan, t-dodecyl mercaptan (TDM for short), n-propyl mercaptan, n-octyl mercaptan, t-octyl mercaptan, t-nonyl mercaptan, terpinolene, etc.

Styrene-Maleic Anhydride Copolymer (SMA)

The styrene-maleic anhydride copolymer is any polymer obtained by copolymerization of styrene monomer (SM), maleic anhydride monomer (MAh), and a second copolymerizable monomer, such as linear or branched random copolymer, linear or branched block copolymer, or mixtures thereof.

In an embodiment, a styrene-maleic anhydride copolymer is formed by polymerizing a mixture containing styrene monomer, maleic anhydride monomer, and a second copolymerizable monomer.

The above-mentioned maleic anhydride monomer can be used alone or in combination. The maleic anhydride monomer is, for example but not limited to, maleic anhydride, itaconic anhydride, citraconic anhydride, aconitic anhydride, etc. In an embodiment, the maleic anhydride monomer is the maleic anhydride.

The styrene monomer can be used alone or in combination, and the styrene monomer is, for example but not limited to, styrene, (1) halogen-substituted styrene, for example but not limited to, 2-chlorostyrene, 4-chlorostyrene, bromostyrene, etc.; and (2) alkyl-substituted styrene, for example but not limited to, vinyl toluene, α-methylstyrene, p-tert-butylstyrene, p-methylstyrene, o-methylstyrene, m-methylstyrene, 2,4-dimethylstyrene, ethylstyrene, etc. In an embodiment, the styrene monomer is at least one selected from a group consisting of styrene, halogen-substituted styrene and alkyl-substituted styrene. In an embodiment, the styrene monomer is at least one selected from a group consisting of styrene and a-methylstyrene.

The second copolymerizable monomer can be used alone or in combination, and the second copolymerizable monomer is, for example but not limited to, selected from one of groups consisting of the methacrylate monomer and the acrylate monomer for the methacrylate polymer, and thus will not be further described.

In an embodiment, the styrene-maleic anhydride copolymer includes styrene monomer unit, maleic anhydride monomer unit, and second copolymerizable monomer unit. The term "monomer unit" as used herein refers to a repetitive structure formed by the polymerization reaction of the aforementioned styrene monomer, maleic anhydride monomer, or second copolymerizable monomer. Therefore, the styrene monomer unit is from the above-mentioned styrene monomer, the maleic anhydride monomer unit is from the above-mentioned maleic anhydride monomer, and the second copolymerizable monomer unit is from the above-mentioned second copolymerizable monomer.

In an embodiment, the styrene-maleic anhydride copolymer includes 65 wt %-85 wt % of styrene monomer unit, 15 wt %-35 wt % of maleic anhydride monomer unit, and 0-20 wt % of second copolymerizable monomer unit.

In another embodiment, in the styrene-maleic anhydride copolymer, the content of the styrene monomer unit is 65 wt %-85 wt %, such as 65 wt %-83 wt % or 66 wt %-81 wt %. When the content of the styrene monomer unit is higher than 65 wt %, the polymethacrylate composition having the styrene-maleic anhydride copolymer with such a styrene monomer unit content has favorable transmittance (T %), haze (HAZE) and yellow index (YI); and when the content of the styrene monomer unit is lower than 85 wt %, the content of the maleic anhydride monomer unit in the styrene-maleic anhydride copolymer is higher than 15 wt %, and therefore, the polymethacrylate composition containing such styrene-maleic anhydride copolymer may have favorable heat resistance (glass transition temperature, Tg).

In an embodiment, in the styrene-maleic anhydride copolymer, the content of the styrene monomer unit is 65 wt % to 83 wt %, and the content of the maleic anhydride monomer unit is 17 wt % to 35 wt %. The polymethacrylate composition having the styrene-maleic anhydride copolymer having above ratio is more applicable to optical devices having high heat resistance requirements. In an embodiment, the styrene-maleic anhydride copolymer having above ratio has a molecular weight distribution index (PDI) ranging from 1.5 to 2.05, and thus it can further have high heat resistance performance on the premise of maintaining favorable transmittance (T %), haze (HAZE) and yellow index (YI).

In an embodiment, in the styrene-maleic anhydride copolymer, the ratio in the weight percentages of the styrene monomer unit to the maleic anhydride monomer unit is between 1 and 8.5, such as between 1.3 and 8 or between 1.5 and 7.

In an embodiment, a weight average molecular weight (Mw) of the styrene-maleic anhydride copolymer is between 60,000 and 100,000, such as between 65,000 and 95,000 or between 65,000 and 90,000.

In an embodiment, a number average molecular weight (Mn) of the styrene-maleic anhydride copolymer is between 30,000 and 55,000, such as between 35000 and 50,000 or between 37,000 and 48,000.

In an embodiment, a molecular weight distribution index (PDI) of the styrene-maleic anhydride copolymer is 1.5 to 2.05, such as 1.7 to 2.0 or 1.7 to 1.9. If the molecular weight distribution index (PDI) of the styrene-maleic anhydride copolymer is greater than 2.05, the optical properties (low haze and low yellow index) of the polymethacrylate composition containing the same would be deteriorated.

The polymerization method of the styrene-maleic anhydride copolymer is not particularly limited, and it may be radical polymerization using a radical initiator. If using the treatment of suspension polymerization or emulsion polymerization, sometimes sufficient transparency cannot be obtained. The radical initiator used is, for example but not limited to, selected from the above-mentioned radical initiator for the methacrylate polymer, and will not be further described.

Based on total 100 parts by weight of the monomers, the amount of the radical initiator is preferably 0.001 to 5 parts by weight. A small amount of solvent may also be used for polymerization. The solvent is, for example but not limited to, aliphatic hydrocarbons such as butane, pentane, hexane, isopentane, heptane, octane, isooctane, etc.; alicyclic hydrocarbons such as cyclopentane, methylcyclopentane, cyclohexane, methylcyclohexane, ethylcyclohexane, etc.; aromatic hydrocarbons such as benzene, toluene, ethylbenzene, xylene, etc. In addition, a known molecular weight modifier, such as 4-methyl-2,4-diphenylpent-1-ene, t-dodecylmercaptan, n-dodecylmercaptan, etc., may be added during the polymerization. The polymerization temperature is preferably 80° C. to 170° C., and more preferably 100° C. to 160° C.

Aromatic Compound Having a Phosphite Group

The aromatic compound having a phosphite group is provided to avoid that the styrene-maleic anhydride copolymer undergoes maleic anhydride ring opening in a high temperature process to change the components of the polymethacrylate composition resulting in the effects to the heat resistance of the composition (Tg dropping), thermal stability (Td dropping), and optical properties (haze and yellow index).

The aromatic compound having a phosphite group is, for example but not limited to, tris(2,4-di-t-butylphenyl)phosphite, bis[2,4-di(1,1-dimethylethyl)-6-methylphenyl]ethyl phosphite, tetra (2,4-di-t-butylphenol)-4,4'-biphenyldiphosphite, bis(2,4-di-t-butylphenyl) pentaerythritol diphosphite, bis(2,6-di-t-butyl-4-methylphenyl) pentaerythritol-diphosphite, bis(2,4-dicumylphenyl)pentaerythritol diphosphite, di-t-butyl m-tolyl phosphite ester, etc., and the above-mentioned compounds can be used alone or in combination.

In one embodiment, the aromatic compound having a phosphite group is preferably a heterocyclic aromatic phosphite compound containing a pentaerythritol diphosphite group, and it includes, for example, a structure represented by formula (1) below.

(1)

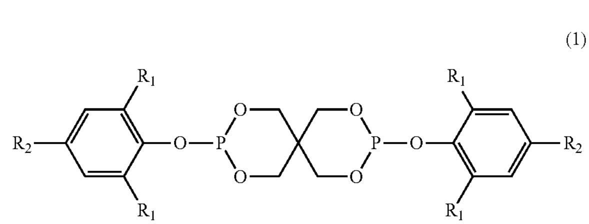

In the above formula, $R_1$ and $R_2$ each independently represent hydrogen or a C1 to C10 linear alkyl group, a C1 to C10 branched alkyl group, a C1 to C10 cyclic alkyl group, or the combination thereof; for example, $R_1$ and $R_2$ each independently hydrogen, methyl, or tert-butyl. The specific example of the aromatic compound having a phosphite group is, for example but not limited to, bis(2,4-di-t-butylphenyl) pentaerythritol diphosphite, bis(2,6-di-t-butyl-4-methylphenyl) pentaerythritol-diphosphite, or bis(2,4-dicumylphenyl)pentaerythritol diphosphite.

In an embodiment, the content of the aromatic compound having a phosphite group in the polymethacrylate composition is 200 ppm-900 ppm, such as 250 ppm-800 ppm or 300 ppm-800 ppm. When the content of the aromatic compound having a phosphite group is within 200 ppm-900 ppm, the polymethacrylate composition containing the aromatic compound having a phosphite group can have a high Tg (good heat resistance), a high Td (good thermal stability), and a preferred optical performance (low yellow index and low haze). Wherein the total amount of the methacrylate polymer and the styrene-maleic anhydride copolymer is 100 parts by weight.

Further, any additive may be mixed according to various purposes within a range not significantly impairing the effects of the present disclosure. The kind of these additives is not particularly limited as long as it is generally used for a resin composition or a rubber composition; for example, the additive includes an antioxidant, a thermal stabilizer, a UV absorber, a slip agent, a processing aid, a filler, a reinforcing agent, A coloring agent, an antistatic agent or other additives, and the additives are not limited to being added during the polymerization reaction, after the polymerization reaction, or during extrusion and mulling. A content of the additives is measured when the total amount of the polymer is 100 parts by weight, that is, when the total amount of the methacrylate polymer and the styrene-maleic anhydride copolymer is 100 parts by weight.

Antioxidant

The antioxidant is an additive other than the aromatic compound having a phosphite group. In an embodiment, the antioxidant includes, for example but not limited to, pentaerythritol tetrakis[3-(3,5-di-tris-butyl-4-hydroxyphenyl) propionate], octadecyl-3-(3,5-di-tertiary-butyl-4-hydroxyphenyepropionate, octadecyl β-(3,5-di-t-butyl-4-hydroxyphenyl)propionate, triethylene glycol bis(3-tert-butyl-4-hydroxy-5-methylphenyl)propionate, 3,5-di-t-butyl-4-hydroxycinnamic acid, 3,9-bis(1,1-dimethyl-2-hydroxyethyl)-2,4,8,10-tetraoxaspiro[5,5]undecane, 3,9-bis (2-(3-(3-tris-butyl-4-hydroxy-5-methylphenyl) propionyloxy)-1,1-dimethylethyl)-2,4,8,10-tetraoxaspiro(5,5)undecane, etc., and the above-mentioned antioxidants can be used alone or in combination.

In one embodiment, the antioxidant is preferably a phenolic compound containing a 2,4,8,10-tetraoxaspiro(5,5)undecyl group, and it includes, for example, a structure represented by formula (2) below.

(2)

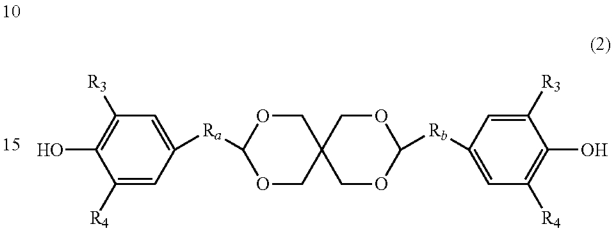

In the above formula, $R_a$ and $R_b$ each independently represent a C6 to C12 alkyl group, a C6 to C12 ether group, a C6 to C12 ester group, or the combination thereof; $R_3$ and $R_4$ each independently represent hydrogen or a C1 to C10 linear, branched or cyclic alkyl group. The specific example of the antioxidant is, for example but not limited to, 3,9-bis (2-(3-(3-tris-butyl-4-hydroxy-5-methylphenyl)propionyloxy)-1,1-dimethylethyl)-2,4,8,10-tetraoxaspiro(5,5)undecane.

The content of the antioxidant in the polymethacrylate composition is 500 ppm-2,000 ppm such as 700 ppm-1,700 ppm or 850 ppm-1,600 ppm. In an embodiment, if the polymethacrylate composition includes an antioxidant and an aromatic compound having a phosphite group and the content ratio of antioxidant to aromatic compound having a phosphite group is within a range of 1.1-10, such as 1.2-8.5 or 1.5-8, the polymethacrylate composition can have high Tg (good heat resistance) and high Td (good thermal stability) performance, and shows a better optical performance of low haze. In an embodiment, the polymethacrylate composition includes 500 ppm-2,000 ppm of the antioxidant and 200 ppm-900 ppm of the aromatic compound having a phosphite group.

Thermal Stabilizer

In one embodiment, a general thermal stabilizer can be used in the present disclosure. In another embodiment, the present disclosure can use a thermal stabilizer represented by the following formula (3).

(3)

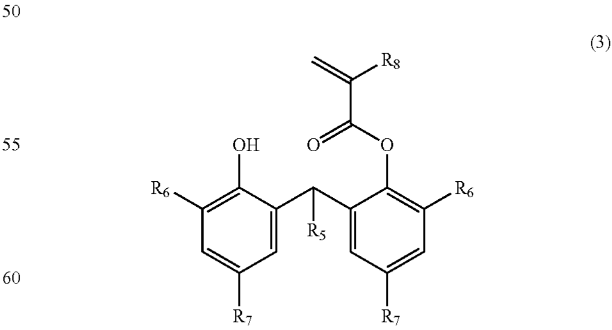

In the above formula, $R_5$ and $R_8$ each independently represent hydrogen or a methyl group, and $R_6$ and $R_7$ each independently represent a C1 to C9 linear, branched or cyclic alkyl group. $R_6$ is, for example, selected from tertiary butyl or tertiary amyl; and $R_7$ is, for example, selected from tertiary butyl, tertiary amyl, or tertiary octyl.

The content of the thermal stabilizer in the polymethacrylate composition is 500 ppm-2,000 ppm. When the content of the thermal stabilizer is within this range, it is possible to balance thermal stability and processability and control production costs. In one embodiment, the content of the thermal stabilizer in the polymethacrylate composition is 700 ppm-1,800 ppm, and in another embodiment, the content of the thermal stabilizer in the polymethacrylate composition is 900 ppm-1,600 ppm.

UV Absorber

In one embodiment, a UV (ultraviolet) absorber can be used in the present disclosure. In one embodiment, a flash point of the UV absorber can higher than the processing temperature. For example, a flash point of the UV absorber is 240° C. or higher to prevent the UV absorber from precipitate in the high temperature process for forming the optical device, and the precipitate usually causes serious mold pollution.

The UV absorber includes, for example but not limited to, 2-(4,6-bis-(2,4-dimethylphenyl)-1,3,5-triazin-2-yl)-5-(octyloxy)phenol, 2,2'-methylenebis[6-(benzotriazol-2-yl)-4-tert-octylphenol], 2-(4,6-diphenyl-1,3,5-triazin-2-yl)-5-[(hexyl) oxy]-phenol, 2,2',4,4'-tetrahydroxybenzophenone, 3-[(2-Cyano-3,3-diphenylacryloyl)oxy]-2,2-bis{[(2-cyano-3,3-diphenylacryloyl)oxy]methyl}propyl 2-cyano-3,3-diphenylacrylate (uvinul 3030), 2-(2H-benzotriazol-2-yl)-6-dodecyl-4-methylphenol, and 2-(2'-hydroxy-3',5'-dipentylphenyl)benzotriazole, etc., and the above-mentioned UV absorbers can be used alone or in combination.

The content of the UV absorber in the polymethacrylate composition is 10,000 ppm-50,000 ppm such as 15,000 ppm-40,000 ppm or 20,000 ppm-35,000 ppm. When the content of the UV absorber is within this range, the UV absorber and the composition can be uniformly mixed, the UV absorber cannot precipitate by the subsequent hot working process to cause mold pollution, and the composition can have good ultraviolet light stability. In one embodiment, if the polymethacrylate composition includes a UV absorber and an aromatic compound having a phosphite group in which the content ratio of the UV absorber to the aromatic compound having a phosphite group is within 10-300 such as 15-200 or 20-180, the polymethacrylate composition can have high Tg (good heat resistance) and high Td (good thermal stability) performance, and shows a better optical performance of low yellow index. In one embodiment, the polymethacrylate composition includes 10,000 ppm-50,000 ppm of the UV absorber and 200 ppm-900 ppm of the aromatic compound having a phosphite group.

Slip Agent

The slip agent includes, for example but not limited to, a metal soap such as calcium stearate, magnesium stearate, lithium stearate and so on; a compound such as ethylene distearylamine, methylene distearylamine, decyl palmitate, butyl stearate, palmitate stearate, polypropionate tristearate, n-docosanoic acid, hard Fatty acid, stearyl alcohol and so on; polyethylene wax, octadecanoic acid wax, Carnuba wax, petroleum wax, etc., and the above-mentioned slip agents can be used alone or in combination.

The content of the slip agent in the polymethacrylate composition is 300 ppm-50,000 ppm.

Processing Aid

The processing aid includes, for example but not limited to a core-shell acrylate processing aid with a weight average molecular weight (Mw) of 500,000 or more so that extrusion moldability, thermoformability, and the like can be improved.

Antistatic Agent

The antistatic agent is a permanent antistatic polymer material including, for example but not limited to, a low molecular weight compound such as a tertiary amine compound or a quaternary ammonium salt compound; or a polyamine polyether such as 3-chloro-1,2-epoxypropane polymer. the above-mentioned antistatic agents can be used alone or in combination.

Filler

The filler includes, for example but not limited to, calcium carbonate, bauxite, mica, etc., and the above-mentioned fillers can be used alone or in combination.

Reinforcing Agent

The reinforcing agent includes, for example but not limited to, glass fiber, carbon fiber, various whiskers, etc., and the above-mentioned reinforcing agents can be used alone or in combination.

Coloring Agent

The coloring agent includes, for example but not limited to, titanium oxide, iron oxide, graphite, phthalocyanine dye, etc., and the above-mentioned coloring agents can be used alone or in combination.

The use of the polymethacrylate composition of the present disclosure is not particularly limited, and it can be applied to various moldings process, such as injection molding, compression molding, extrusion molding, blow molding, thermoforming, vacuum forming, hollow molding and so on; and various finished products made by the above-mentioned molding process such as: plate, film molded products, etc. The polymethacrylate composition can be formulated according to the needs of high fluidity, high heat stability, etc.

The polymethacrylate composition can be obtained by a general mixing muller such as a Brabender plastometer, a Banbury mixer, a kneading-mixer, a roller, a single- or a twin-screw extruder, etc. Usually, after mixing and mulling by the extruder, the extrudate is cooled and granulated. The polymethacrylate composition is generally mulled at 160° C. to 280° C., preferably 180° C. to 250° C. Furthermore, the mixing and mulling of each components is not particularly limited in order.

The optical device according to another embodiment of the present disclosure is formed by the polymethacrylate composition as described above and has excellent optical properties of low haze and low yellow index. In an embodiment, the optical device may be an optical material with a planar structure such as an optical plate, an optical sheet, an optical film, or the like. In an embodiment, a method for preparing the optical material with the planar structure is not particularly limited herein, and the polymethacrylate composition may be melted through an extruder and then extruded into a plate-shaped, sheet-shaped or film-shaped unstretched optical plate, optical sheet or optical film. In another embodiment, a tenter may be used to laterally stretch or biaxially stretch the unstretched optical plate, optical sheet, or optical film at a temperature higher than the glass transition temperature thereof.

In one embodiment, the optical device is, for example, an optical plate having planar structure which includes a body in the form of a sheet, and the body comprises a plane. The body has a rectangular shape and is made of the above polymethacrylate composition.

In another embodiment, the optical device is, for example, an optical plate having microstructures. Referring to FIG.

1A, it shows an optical plate 10 having microstructures. The optical plate 10 includes a body 12, the body 12 has a surface 122, and a plurality of first microstructures 132 are disposed on the surface 122. As shown in FIG. 1A, each of the first microstructures 132 of this embodiment is a concave pit structure, but it is not limited thereto. In other embodiments, each of the first microstructures 132 may be a bump structure or a structure having other shapes.

Figure 1B:
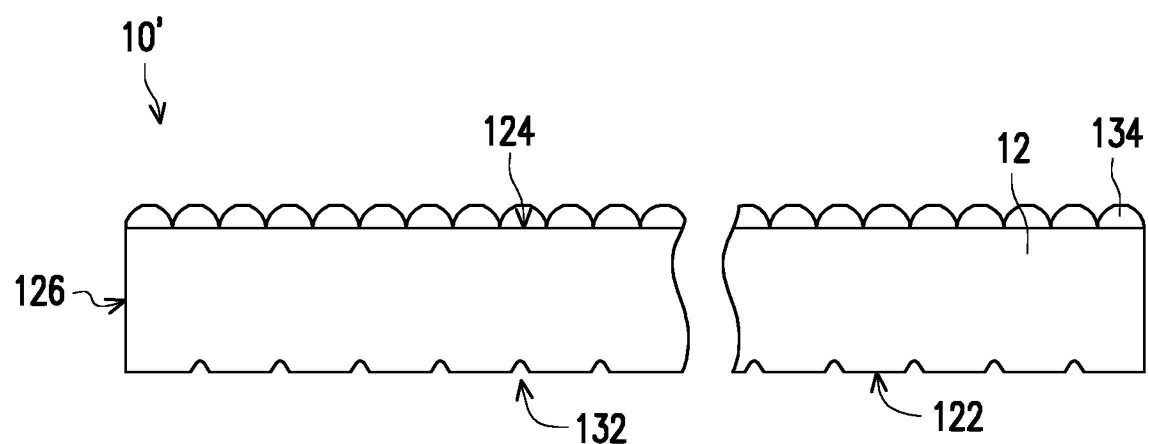
FIG. 1B is a cross-sectional schematic of an optical device according to another embodiment of the disclosure.

Referring to FIG. 1B, it shows yet another embodiment of the optical device in which, in addition to the first microstructures 132 of FIG. 1A, a plurality of second microstructures 134 are further disposed on other surface such as the surface 124 opposite to the surface 122 or the side surface 126 vertical to the surface 122, and the second microstructures 134 are, for example, microlens and are disposed on the surface 124. In this embodiment, each of the second microstructures 134 is semi-circular shape, but it is not limited thereto. In other embodiments, each of the second microstructures 134 may be a suitable protruding structure such as a prism or a corner pillar. Moreover, the optical device can also be an optical plate having the second microstructures 134 alone.

Figure 2A:
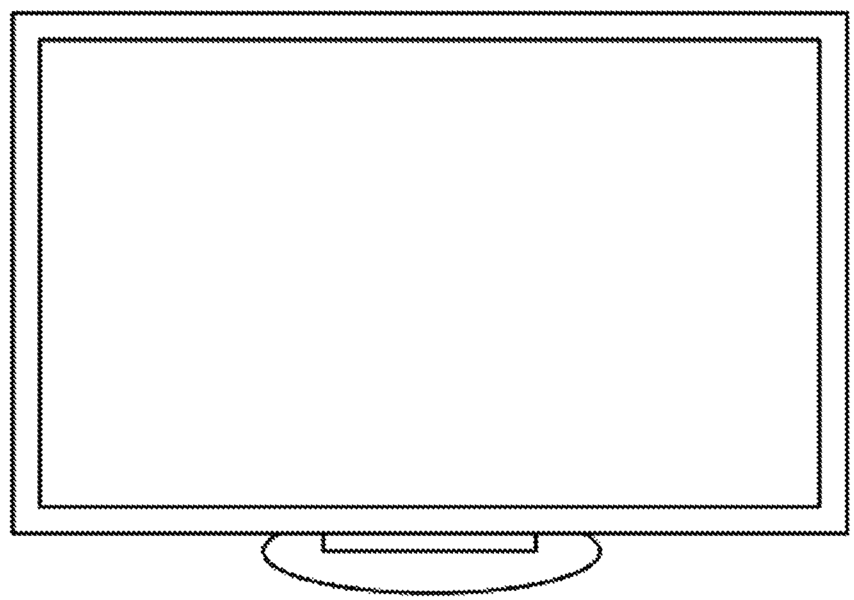
FIGS. 2A to 2E are schematic views of display apparatus according to some embodiment of the disclosure.
Figure 2B:
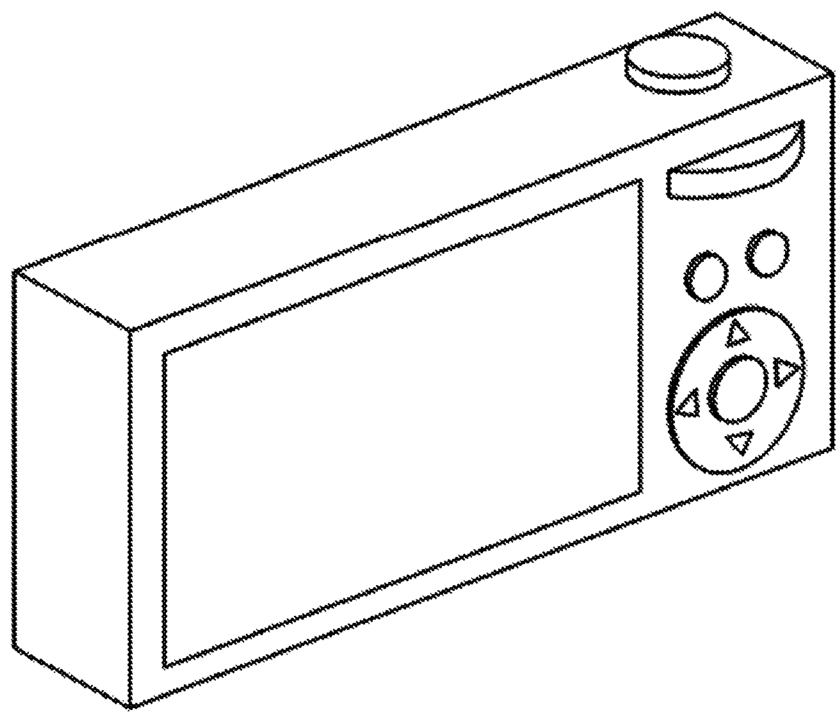
Figure 2C:
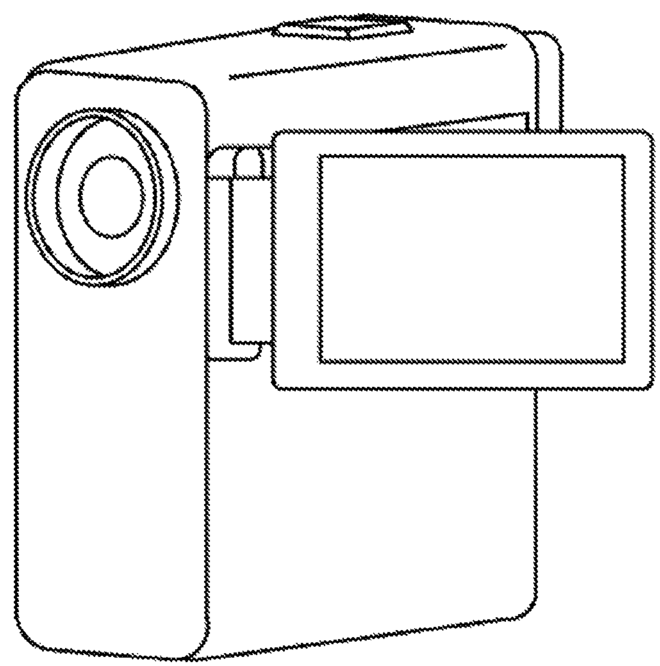
Figure 2D:
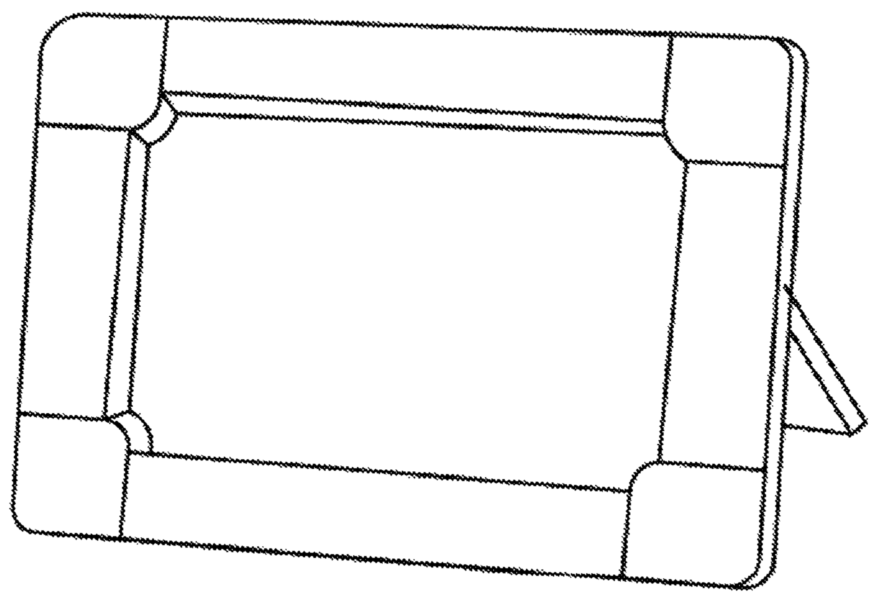
Figure 2E:
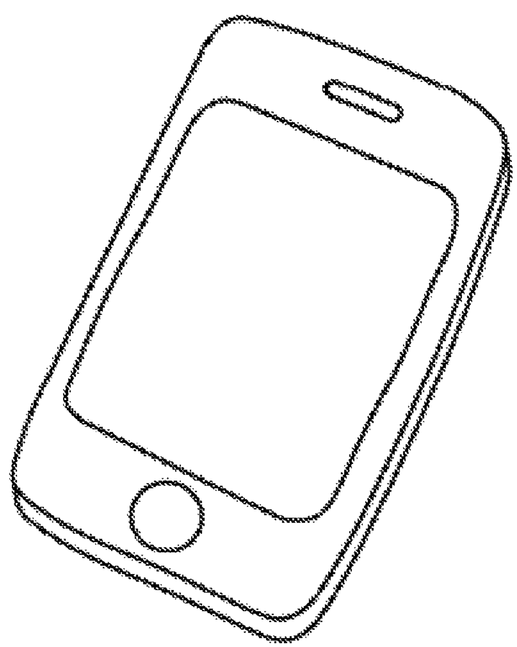

In some embodiments, the optical device can be applied in various display apparatuses. The display apparatus can be, for instance, a television (also referred to as TV or TV receiver) (as shown in FIG. 2A), digital camera (as shown in FIG. 2B), digital video camera (as shown in FIG. 2C), digital photo frame (as shown in FIG. 2D), mobile phone (as shown in FIG. 2E), notebook personal computer, mobile computer, a monitor used in, for instance, a computer, a portable game console, portable information terminal, audio reproduction apparatus, game console, and car display.

The polymethacrylate composition of the present disclosure will be described more specifically with reference to several experiments. Although the following experiments are described, materials, their amounts and ratios, processing details, processing procedures, and the like can be appropriately changed without exceeding the scope of the present disclosure. Therefore, the present disclosure should not be construed restrictively based on the experiments described below.

<Raw Materials Used in Embodiments and Comparative Embodiments>

1. PMMA: methacrylate polymer.

1.1. Preparation of PMMA1

Firstly, 95 parts by weight of methyl methacrylate, 5 parts by weight of methyl acrylate, 0.4 part by weight of n-dodecyl mercaptan, 0.08 part by weight of 2,2'-azobis-(isobutyronitrile) and 66 parts by weight of toluene were mixed, and continuously fed into a reaction tank for continuous solution polymerization reaction. The above reaction tank is a sandwich with heat medium oil circulation, and the reaction temperature was maintained at 100° C. and the pressure was 600 torr. The components in the reaction tank were thoroughly stirred and uniformly mixed, and a resulting polymer solution was heated to 265° C. Thereafter, the polymer solution was devolatilized under a reduced pressure by using a continuous devolatilizer, and then was prepared into strips through the extruder. The strips were cooled and granulated to obtain polymethyl methacrylate resin pellets. The polymethyl methacrylate resin pellets contained 97 wt % of methyl methacrylate monomer unit and 3 wt % of methyl acrylate monomer unit. The weight average molecular weight (Mw) is measured by GPC and using polystyrene standard, the Mw of polymethyl methacrylate resin pellets was 100,000, and the melt flow rate (MVR) (230° C.*3.8 kg)=1.9.

1.2. Preparation of PMMA2

Firstly, 94 parts by weight of methyl methacrylate, 6 parts by weight of methyl acrylate, 0.5 part by weight of n-dodecyl mercaptan, 0.1 part by weight of 2,2'-azobis-(isobutyronitrile) and 66 parts by weight of toluene were mixed, and continuously fed into a reaction tank for continuous solution polymerization reaction. The above reaction tank is a sandwich with heat medium oil circulation, and the reaction temperature was maintained at 100° C. and the pressure was 600 torr. The components in the reaction tank were thoroughly stirred and uniformly mixed, and a resulting polymer solution was heated to 265° C. Thereafter, the polymer solution was devolatilized under a reduced pressure by using a continuous devolatilizer, and then was prepared into strips through the extruder. The strips were cooled and granulated to obtain polymethyl methacrylate resin pellets. The polymethyl methacrylate resin pellets contained 95.5 wt % of methyl methacrylate monomer unit and 4.5 wt % of methyl acrylate monomer unit. The weight average molecular weight (Mw) is measured by GPC and using polystyrene standard, the Mw of polymethyl methacrylate resin pellets was 90,000, and the melt flow rate (MVR) (230° C.*3.8 kg)=3.0.

2. SMA: styrene-maleic anhydride copolymer.

2.1. Preparation of SMA1

In a 40 L stirred reactor, 7,440 g of maleic anhydride was added after being purged with nitrogen for 10 minutes, and the temperature was raised to 130° C., followed by a constant temperature for 30 minutes. Then, the temperature was maintained at 130° C., and a mixed solution containing 22,560 g of styrene and 12 g of 2,2'-azobis-(isobutyronitrile) was continuously added within 1 hour, and the temperature was lowered to 110° C. after the end of the feed. The reaction was carried out at a constant temperature for 4 hours, after which the unreacted maleic anhydride was first washed away with acetone, and unreacted styrene was removed in a vacuum oven at 80° C. to obtain a bulky styrene-maleic anhydride copolymer.

2.2. Preparation of SMA2

The preparation method was the same as that of SMA1, but the addition amount of the maleic anhydride was adjusted to 9570 g, and the addition amount of the styrene was adjusted to 20430 g.

2.3. Preparation of SMA3

The preparation method was the same as that of SMA1, but the addition amount of the maleic anhydride was adjusted to 8190 g, the addition amount of the styrene was adjusted to 21810 g, and the addition amount of the 2,2'-azobis-(isobutyronitrile) was adjusted to 14 g.

The weight percentage of styrene monomer unit (SM), the weight percentage of maleic anhydride monomer unit (MAh), the ratio of the weight percentage of styrene monomer unit to the weight percentage of maleic anhydride monomer unit (SM/MAh), the number average molecular weight (Mn), the weight average molecular weight (Mw), and the polydispersity index (PDI) (Q) of SMA1 to SMA3 measured by GPC and using polystyrene standard are shown in Table 1.

TABLE 1

| | SM | MAh | SM/MAh | Mn | Mw | Q |
|---|---|---|---|---|---|---|
| SMA1 | 76.8 wt % | 23.2 wt % | 3.31 | 37,916 | 67,250 | 1.77 |
| SMA2 | 67.9 wt % | 32.1 wt % | 2.12 | 36,560 | 65,810 | 1.80 |
| SMA3 | 73.2 wt % | 26.8 wt % | 2.73 | 37,260 | 65,228 | 1.75 |

3. Aromatic compound having a phosphite group: Bis(2,6-di-tert-butyl-4-methylphenyl) pentaerythritol-diphosphite.

4. Thermal stabilizer: a thermal stabilizer represented by the formula (3) in which $R_5$ is methyl, $R_6$ and $R_7$ are both tertiary amyl, and $R_8$ is hydrogen.

5. Antioxidant:

3,9-bis(2-(3-(3-tris-butyl-4-hydroxy-5-methylphenyl)propionyloxy)-1,1-dimethylethyl)-2,4,8,10-tetraoxaspiro(5,5)undecane.

6. UV absorber: 2,2'-methylenebis[6-(benzotriazol-2-yl)-4-tert-octylphenol], and its flash point is 420.5±35.7° C.

[Evaluation Items]

Transmittance (T %): After the polymethacrylate compositions of Embodiments 1 to 4 and Comparative Embodiments 1 were formed into disk test pieces having a diameter of 5.5 cm and a thickness of 3 mm, they were measured by a Haze Meter NDH 2000N, unit: %. Based on the demand for commercially available optical films, it is generally desirable to have the transmittance being greater than 90%.

Haze (HAZE): After the polymethacrylate compositions of Embodiments 1 to 4 and Comparative Embodiments 1 were formed into disk test pieces having a diameter of 5.5 cm and a thickness of 3 mm, they were measured by a Haze Meter NDH 2000N, unit: %. Based on the demand for commercially available optical films, it is generally desirable to have the haze being less than 1.5.

Yellow index (YI): After the polymethacrylate compositions of Embodiments 1 to 4 and Comparative Embodiments 1 were formed into disk test pieces having a diameter of 5.5 cm and a thickness of 3 mm, they were measured by a computer spectrophotometer SA-2000 from Nippon Denshoku Industries Co. Ltd.

Glass transition temperature (Tg): The polymethacrylate compositions of Embodiments 1 to 4 and Comparative Embodiments 1 were measured by a differential scanning calorimeter (DSC). Unit: ° C.

Thermal degradation temperature (5% weight loss temperature, Td): 5 mg of polymethacrylate composition of Embodiments 1 to 4 and Comparative Embodiments 1 were taken as samples, respectively. The samples were placed in a thermogravimetric analyzer (TGA) and then analyzed in the following conditions: under a nitrogen atmosphere, the temperature was raised from 100° C. to 600° C. at a heating rate of 20° C./min, and the temperature at 5% weight loss was measured.

Embodiments 1 to 4

Embodiments 1 to 4 are polymethacrylate compositions prepared by mixing the methacrylate polymer and styrene-maleic anhydride copolymer according to the respective ratios listed in Table 2, then mixing with the thermal stabilizer, the antioxidant, the aromatic compound having a phosphite group and the UV absorber and then performing extrusion granulating at 240° C. in an extruder. The total amount of the methacrylate polymer and the styrene-maleic anhydride copolymer is 100 parts by weight. The amounts of the thermal stabilizer, the antioxidant, the aromatic compound having a phosphite group and the UV absorber listed in Table 3 is a real content result measured form polymethacrylate compositions of Embodiments 1 to 4 by using high performance liquid chromatography (HPLC). The detection results of the haze (HAZE), yellow index (YI), transmittance (T %), thermal degradation temperature (Td), and glass transition temperature (Tg) are also recorded in Table 3.

Comparative Embodiment 1

Comparative Embodiment 1 is polymethacrylate compositions prepared according to the respective component ratios listed in Table 2, then mixing with thermal stabilizer, the antioxidant, and the UV absorber in the same manner as in Embodiments 1 to 4. The total amount of the methacrylate polymer and the styrene-maleic anhydride copolymer is 100 parts by weight. The amounts of the thermal stabilizer, the antioxidant, and the UV absorber listed in Table 3 is a real content result measured form polymethacrylate composition of Comparative Embodiment 1 by using high performance liquid chromatography (HPLC). The detection results of the haze (HAZE), yellow index (YI), transmittance (T %), thermal degradation temperature (Td), and glass transition temperature (Tg) are also recorded in Table 3.

TABLE 2

| | Comparative Embodiment 1 | Embodiment 1 | Embodiment 2 | Embodiment 3 | Embodiment 4 |
|---|---|---|---|---|---|
| PMMA1 (parts b weight) | 71.2 | 72 | 72 | 71 | — |
| PMMA2 (parts by weight) | — | — | — | — | 72.8 |
| SMA1 (parts by weight) | 28.8 | 28 | 28 | — | — |
| SMA2 (parts by weight) | — | — | — | 29 | — |
| SMA3 (parts by weight) | — | — | — | — | 27.2 |

TABLE 3

| | Comparative Embodiment 1 | Embodiment 1 | Embodiment 2 | Embodiment 3 | Embodiment 4 |
|---|---|---|---|---|---|
| Thermal stabilizer (ppm) | 1257 | 1303 | 1351 | 1183 | 858 |
| Antioxidant (ppm) | 1183 | 1289 | 1158 | 1191 | 586 |
| Aromatic compound having a phosphite group (ppm) | 0 | 336 | 478 | 410 | 231 |
| a content ratio of the antioxidant to the aromatic compound having a phosphite group | ∞ | 3.84 | 2.42 | 2.90 | 2.54 |
| UV absorber (ppm) | 21221 | 20295 | 21580 | 22031 | 21969 |
| a content ratio of the UV absorber to the aromatic compound having a phosphite group | ∞ | 60.40 | 45.17 | 53.73 | 95.10 |
| Tg (° C.) | 126.1 | 127.4 | 128.7 | 127.3 | 125.3 |
| Td (° C.) | 316 | 322 | 330 | 325 | 330 |
| YI | 11 | 9.5 | 8.5 | 9.0 | 6.43 |
| HAZE (%) | 1.8 | 1.3 | 0.4 | 0.6 | 0.54 |
| T (%) | 91.1 | 91.6 | 91.9 | 91.9 | 92.1 |

According to the results of Embodiments 1 to 4, it can be found that the polymethacrylate composition including 50 to 85 parts by weight of methacrylate polymer, 15 to 50 parts by weight of styrene-maleic anhydride copolymer and an aromatic compound having a phosphite group, wherein the methacrylate polymer including methacrylate monomer unit and acrylate monomer unit and having a weight average molecular weight (Mw) in a range between 20,000 and 200,000, the styrene-maleic anhydride copolymer including 65 wt %-85 wt % of styrene monomer unit, 15 wt %-35 wt % of maleic anhydride monomer unit, and 0-20 wt % of second copolymerizable monomer unit, and the content of the aromatic compound having a phosphite group in the polymethacrylate composition being within a range of 200 ppm-900 ppm can maintain better heat resistance (higher Tg) and better thermal stability (higher Td). In other words, the presence of the aromatic compound having a phosphite group can increase the thermal degradation temperature and maintain high heat resistance of the composition. Moreover, Embodiments 1 to 4 containing 200 ppm-900 ppm of the aromatic compound having a phosphite group and 10,000 ppm-50,000 ppm of the UV absorber have a good yellow index (YI).

In addition, as shown from Table 3, Embodiments 1 to 4 contain 200 ppm-900 ppm of the aromatic compound having a phosphite group and 500 ppm-2,000 ppm of the antioxidant, and thus it has better haze performance and high transmittance under the action of the aromatic compound having a phosphite group and the antioxidant.

What is claimed is:

1. A polymethacrylate composition, comprising:

50 to 85 parts by weight of methacrylate polymer, wherein the methacrylate polymer includes methacrylate monomer unit and acrylate monomer unit and has a weight average molecular weight in a range between 20,000 and 200,000;

15 to 50 parts by weight of styrene maleic anhydride copolymer;

200 ppm-900 ppm of aromatic compound having a phosphite group; and 10,000 ppm-50,000 ppm of an UV absorber, wherein a flash point of the UV absorber is 240° C. or higher, wherein the total amount of the methacrylate polymer and the styrene maleic anhydride copolymer is 100 parts by weight, and the styrene maleic anhydride copolymer includes 65 wt %-85 wt % of styrene monomer unit, 15 wt %-35 wt % of maleic anhydride monomer unit, and 0-20 wt % of second copolymerizable monomer unit.

2. The polymethacrylate composition according to claim 1, wherein the methacrylate polymer includes 92 wt %-99 wt % of the methacrylate monomer unit, 1 wt %-8 wt % of the acrylate monomer unit, and 0-7 wt % of first copolymerizable monomer unit, and a weight average molecular weight (Mw) of the methacrylate polymer is between 50,000 and 150,000.

3. The polymethacrylate composition according to claim 2, wherein the first copolymerizable monomer unit is at least one selected from a group consisting of unsaturated carboxylic monomer unit, maleimide monomer unit, propenyl-containing compound monomer unit, vinyl-containing compound monomer unit and styrene monomer unit.

4. The polymethacrylate composition according to claim 1, wherein the ratio of the weight percentage of the styrene monomer unit to the weight percentage of the maleic anhydride s monomer unit in the styrene maleic anhydride copolymer is between 1 and 8.5.

5. The polymethacrylate composition according to claim 1, wherein a weight average molecular weight (Mw) of the styrene maleic anhydride copolymer is between 60,000 and 100,000.

6. The polymethacrylate composition according to claim 1, wherein the second copolymerizable monomer unit is selected from at least one of a group consisting of methyl methacrylate monomer unit, ethyl methacrylate monomer unit, propyl methacrylate monomer unit, n-butyl methacrylate monomer unit, amyl methacrylate monomer unit, cyclohexyl methacrylate monomer unit, heptyl methacrylate monomer unit, n-octyl methacrylate monomer unit, octadecyl methacrylate monomer unit, phenyl methacrylate monomer unit, benzyl methacrylate monomer unit, 2-ethylhexyl methacrylate monomer unit, methyl acrylate monomer unit, ethyl acrylate monomer unit, propyl acrylate monomer unit, butyl acrylate monomer unit, amyl acrylate monomer unit, n-hexyl acrylate monomer unit, cyclohexyl acrylate monomer unit, heptyl acrylate monomer unit, dodecyl acrylate monomer unit, phenyl acrylate monomer unit, benzyl acrylate monomer unit, 2-ethylhexyl acrylate monomer unit, and octadecyl acrylate monomer unit.

7. The polymethacrylate composition according to claim 1, further comprising an antioxidant and a content ratio of the antioxidant to the aromatic compound having a phosphite group is within 1.1-10.

8. The polymethacrylate composition according to claim 1, further comprising 500 ppm-2,000 ppm of an antioxidant.

9. The polymethacrylate composition according to claim 1, further comprising 500 ppm-2,000 ppm of a thermal stabilizer.

10. The polymethacrylate composition according to claim 1, wherein the UV absorber is selected from at least one of a group consisting of 2-(4,6-bis-(2,4-dimethylphenyl)-1,3,5-triazin-2-yl)-5-(octyloxy)phenol, 2,2'-methylenebis[6-(benzotriazol-2-yl)-4-tert-octylphenol], 2-(4,6-diphenyl-1,3,5-triazin-2-yl)-5-[(hexyl)oxy]-phenol, 2,2',4,4'-tetrahydroxybenzophenone, 3-[(2-Cyano-3,3-diphenylacryloyl)oxy]-2,2-bis{[(2-cyano-3,3-diphenylacryloyl)oxy]methyl}propyl 2-cyano-3,3-diphenylacrylate, 2-(2H-benzo Triazol-2-yl)-6-dodecyl-4-methylphenol, and 2-(2'-hydroxy-3',5'-dipentylphenyl) benzotriazole.

11. An optical device, being made from the polymethacrylate composition according to claim 1.

12. The optical device according to claim 11, wherein the optical device is at least one selected from the group consisting of an optical plate, an optical sheet, and an optical film.

13. A display apparatus, comprising:

the optical device according to claim 11, wherein the display apparatus is at least one selected from the group consisting of a television, a digital camera, a digital photo frame, a mobile phone, a notebook personal computer, a mobile computer, a monitor used in a computer, a portable game console, a portable information terminal, an audio reproduction apparatus, a game console, and a car display.

14. The polymethacrylate composition according to claim 1, wherein a content ratio of the UV absorber to the aromatic compound having a phosphite group is within 10-300.

15. The polymethacrylate composition according to claim 1, wherein a content ratio of the UV absorber to the aromatic compound having a phosphite group is within 15-200.

16. The polymethacrylate composition according to claim 1, wherein a content ratio of the UV absorber to the aromatic compound having a phosphite group is within 20-180.

* * * * *